Aug. 26, 1924. 1,506,093
K. SKERRETT
VENTILATING DEVICE FOR MOTOR CARS AND THE LIKE
Filed Oct. 19, 1923 2 Sheets-Sheet 1
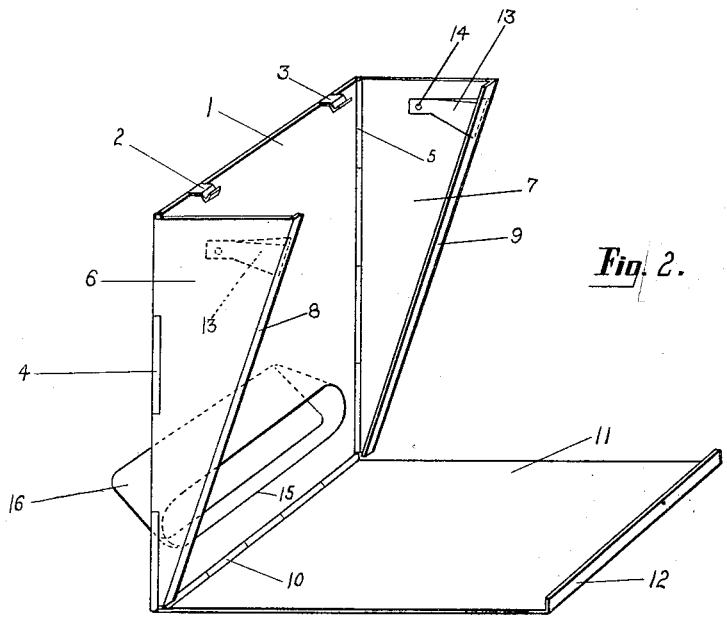
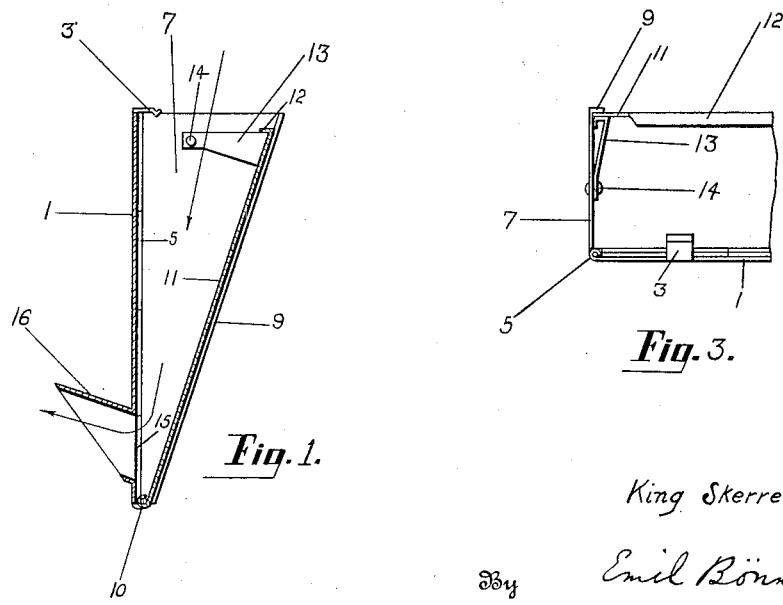
Inventor
King Skerrett
By Emil Bönnelyche
Attorney Aug. 26, 1924.

K. SKERRETT 1,506,093

VENTILATING DEVICE FOR MOTOR CARS AND THE LIKE

Filed Oct. 19, 1923    2 Sheets-Sheet 2

Inventor
King Skerrett.
By Emil Bönnelycke
Attorney

Patented Aug. 26, 1924.

1,506,093

UNITED STATES PATENT OFFICE.

KING SKERRETT, OF BUENOS AIRES, ARGENTINA.

VENTILATING DEVICE FOR MOTOR CARS AND THE LIKE.

Application filed October 19, 1923. Serial No. 669,548.

*To all whom it may concern:*

Be it known that I, KING SKERRETT, subject of the King of England, residing at 1871 Guido Street, Buenos Aires, Argentina, have invented certain new and useful Improvements in Ventilating Devices for Motor Cars and the like, of which the following is a specification.

My invention relates to certain improvements in attachments for motor cars and the like its object being to provide the driver's compartment of such cars with adjustable ventilating means for the legs and feet of the driver.

In order that my invention may be clearly understood and easily carried into practice, a preferred embodiment thereof has been shown by way of example in the appended drawings, wherein:

Figure 1, is a sectional view of my device in its open position.

Figure 2, is a perspective view thereof.

Figure 3, is a partial front view also in open position.

Similar characters of reference denote same or like parts throughout the said figures.

Figure 5:
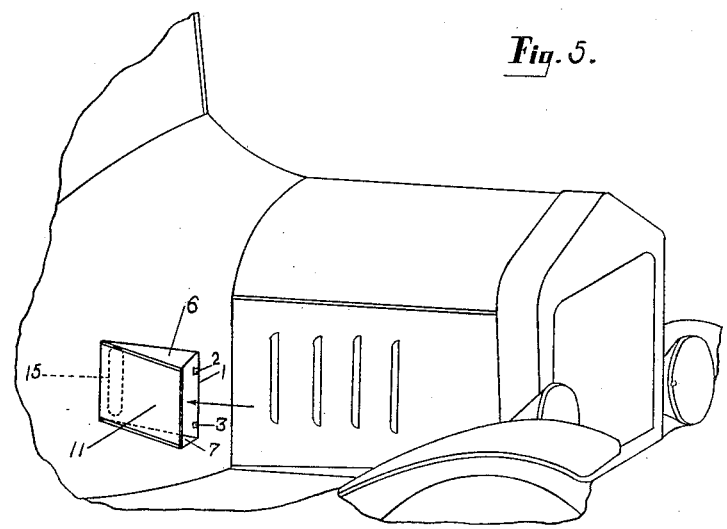
Figure 5, shows the device as applied to the body of a motor car.

My device comprises a substantially rectangular metal base plate 1 having holding clips 2 and 3 on one of its edges. The lateral edges of said plate have triangular side portions 6 and 7 hinged at 4 and 5 respectively to the plate 1, said portions having inturned edges as shown at 8 and 9. The edge of plate 1 opposite to the edge on which the clips 2 and 3 are fixed, has a hinge 10 thereon on which a similar rectangular cover plate 11 is hinged, this latter having its opposite edge formed in the shape of an inturned flange 12. 13 are spring members riveted at 14 to the triangular side portions 6 and 7, said springs being arranged to hold the plate 11 in its open position against the inturned edges, as clearly shown in Figure 1.

Near the hinge 10 and parallel thereto, the plate 1 has an elongated opening 15 to which a guide duct or funnel 16 is suitably fixed.

For fixing the device to the car, as shown in Figure 5, a slot is made corresponding to the funnel at the side of the body of the car, through which the funnel 16 is passed, plate 1 being then suitably secured to the outer face of said body.

Figure 4:
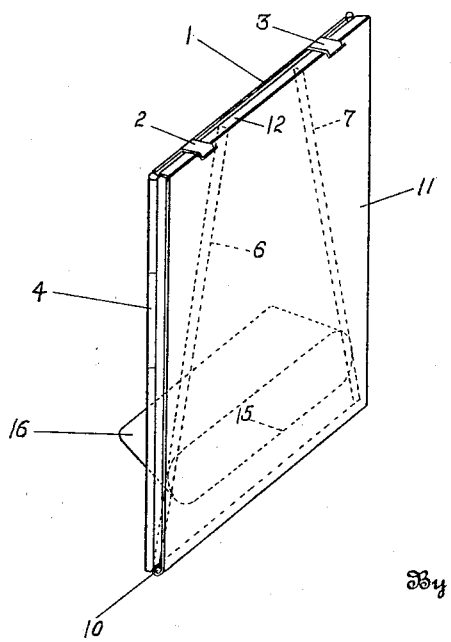
Figure 4, shows the device in its closed position.

For ventilation purposes, the device may be open as shown in Figure 5, or it may be closed as in Fig. 4.

It is obvious that many constructional and other changes may be made without departing from the scope of my present invention which has been clearly set forth in the appended claims.

Having now fully described and ascertained the nature of my present invention and in what manner the same is to be carried into practice, I declare that what I desire to protect by Letters Patent is:—

1. A ventilating device comprising a base plate having an elongated slot therein; a pair of triangular side portions hinged to opposite edges of said base plate, each of said portions being provided with a spring member; a cover plate hinged to the third edge of said base plate and adapted to be held in open position by means of said spring members on the side portions; a funnel secured to said base plate corresponding to the slot therein; and means on the fourth edge of said base plate for holding said cover plate in closed position.

2. A ventilating device comprising a base plate having an elongated slot therein; a pair of triangular side portions hinged to opposite edges of said base plate and each provided with an inturned edge; a cover plate hinged to the third edge of said base plate; a spring member on each of said side portions adapted to hold said cover plate against said inturned edge in the open position; a funnel secured to said base plate corresponding to the slot therein; and a pair of holding clips on the fourth edge of said base plate for holding said cover plate in closed position.

3. A ventilating device comprising a base plate having an elongated slot therein; a pair of triangular side portions hinged to opposite edges of said base plate; a cover plate hinged to the third edge of said base plate; a funnel secured to and extending at approximately right angles from said base plate and corresponding to said slot; means on said side portions for holding said cover plate in open position; and means on the fourth edge of said base plate for holding said cover plate in closed position.

KING SKERRETT.